(12) United States Patent
Kirby et al.

(10) Patent No.: US 6,562,387 B2
(45) Date of Patent: May 13, 2003

(54) AMBIENT STABLE BEVERAGE AND PROCESS OF MAKING

(75) Inventors: Roy Michael Kirby, Bedford (GB); David Savage, Bedford (GB); Malcolm Stratford, Bedford (GB)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 68 days.

(21) Appl. No.: 09/854,881

(22) Filed: May 14, 2001

(65) Prior Publication Data

US 2002/0012737 A1 Jan. 31, 2002

(30) Foreign Application Priority Data

May 15, 2000 (GB) .............................................. 0011674

(51) Int. Cl.[7] .............................. A23L 2/00; A23L 2/38; A23F 3/00
(52) U.S. Cl. .................... 426/330.3; 426/335; 426/532; 426/597; 426/590; 426/651
(58) Field of Search .............................. 426/330.3, 597, 426/590, 651, 335, 532

(56) References Cited

U.S. PATENT DOCUMENTS

| 3,382,032 A | 5/1968 | Cox |
| 3,936,269 A | 2/1976 | Bayne |
| 3,979,524 A * | 9/1976 | Bayne .......................... 426/305 |
| 4,234,611 A | 11/1980 | Kahn et al. |
| 5,738,888 A * | 4/1998 | Cirigliano et al. ............. 426/52 |
| 5,866,182 A | 2/1999 | Exner et al. |
| 6,036,986 A | 3/2000 | Cirigliano et al. |
| 6,042,861 A1 * | 3/2001 | Anslow et al. ........... 426/330.3 |

FOREIGN PATENT DOCUMENTS

| EP | 0 858 828 A1 | 8/1998 |
| GB | 296 11 147 U1 | 11/1996 |
| WO | 01/32020 | 5/2001 |

OTHER PUBLICATIONS

Patent Act 1977 Search Report under Section 17 (GB 0011674.9).

PCT International Search Report on PCT Application No. PCT/EP 01/05303.

* cited by examiner

Primary Examiner—Helen Pratt

(57) ABSTRACT

An ambient stable beverage that contains a preservative system that contains cinnamic acid, dimethyl dicarbonate and at least one essential oil. The beverage contains a minimum concentration of preservatives and has a pleasant taste.

11 Claims, 22 Drawing Sheets

Tea 0
Cinnamic acid 1-175 ppm
DMDC 1-250 ppm

US 6,562,387 B2

AMBIENT STABLE BEVERAGE AND PROCESS OF MAKING

FIELD OF THE INVENTION

The present invention relates to an ambient stable beverage, particularly a tea based beverage, that is preserved by a preservative system that comprises cinnamic acid, dimethyl dicarbonate and at least one essential oil.

BACKGROUND AND PRIOR ART

In recent years there has been an ever increasing choice for consumers who wish to quench their thirst with ready made beverages. Many of those are now turning from the well known soft drinks to tea based beverages, be those carbonated or still, and the "natural" refreshment they can provide.

Tea contains a complex combination of enzymes, biochemical intermediates and structural elements normally associated with plant growth and photosynthesis. There are also many natural substances that give tea its unique taste, astringency, aroma and colour. Many of these are produced by the oxidation reactions that occur during the so-called fermentation stage of black tea manufacture. Tea production has long been driven by traditional processing methods with only a fundamental understanding of the chemistry that is involved. As a consequence manufacturers have discovered making ambient stable tea based beverages at the volumes required to compete with more traditional soft drinks is not simply a matter of flavouring a soft drink with tea.

The flavour of a tea based beverage and its stability rely on the stability of the beverage as a whole. The fungi including yeasts and moulds that can grow in tea based beverages and other soft drinks can be killed by heat treatment or at least controlled by use of preservatives. Some tea based beverages are therefore pasteurised and then bottled in glass or special heat stable PET containers. This is known as "hot filling". Unfortunately this can be an expensive operation that creates a great deal of environmentally unfriendly waste. It has therefore become more attractive for manufacturers to pack their tea based products in standard PET containers which can range from single serve units to multi-serve packs and maintain the stability of the product using tailor made flavour and preservative systems. This is known as "cold filling". It is also useful in that one can readily use a tea concentrate or powder.

Unfortunately the use of common preservatives can affect the flavour of a tea based beverage. This is particularly true for sulphite and sorbate. Adding a strong flavour such as lemon can offset the preservative taste. However consumers are keen to experience other flavours. Furthermore, some of those consumers that were drawn to tea based products as a more healthy and natural alternative to soft drinks sometimes view preservatives as the sort of synthetic additives they would rather avoid.

Many countries have regulations that prohibit the use of certain food additives, including some fungicides and preservatives, in foods and beverages. Regulations can vary widely but there is a clear trend for foods to contain fewer and lower levels of chemical fungicides and preservatives, particularly synthetic ones.

Accordingly there is a need for pleasantly flavoured, ambient-stable, tea based beverages that have low levels of synthetic preservatives.

In response to that need the present inventors have now developed an ambient stable tea based beverage that is preserved by a preservative system that comprises cinnamic acid, dimethyl dicarbonate and at least one essential oil. Non-tea based beverages including fruit and soft drinks can be stabilised in a similar way.

STATEMENT OF THE INVENTION

The invention can in broad terms be said to relate to an ambient stable beverage, such as a tea based beverage, that is preserved by a preservative system that comprises cinnamic acid, dimethyl dicarbonate and at least one essential oil.

The beverage preferably contains 1 to 175 ppm cinnamic acid, 1 to 500 ppm dimethyl dicarbonate (DMDC) and 1 to 100 ppm of at least one essential oil. When the beverage is tea based it preferably contains 0.01 to 3% tea solids, especially about 0.14%.

The invention can also be said to relate to a method for preparing an ambient-stable tea based beverage suitable for cold filing comprising adding cinnamic acid, dimethyl dicarbonate and at least one essential oil to a tea extract.

"Beverage" for the purposes of the present invention means any drink, other than water, and includes soft drinks, fruit drinks, coffee based drinks and tea based drinks.

"Essential oil" for the purposes of the present invention includes any of the volatile oils in plants having the odour or flavour of the plant from which they are extracted. It also includes one or more of the components of that oil that is or are responsible for or at least contributes to the odour or flavour of that plant.

"Tea" for the purposes of the present invention means leaf material from *Camellia sinensis* var. *sinensis* or *Camellia sinensis* var. *assamica*. "Tea" is also intended to include the product of blending two or more of any of these teas.

For the avoidance of doubt the word "comprising" is intended to mean including but not necessarily "consisting of" or "composed of". In other words the listed steps or options need not be exhaustive.

Except in the operating and comparative examples, or where otherwise explicitly indicated, all numbers in this description indicating amounts or concentrations of material ought to be understood as modified by the word "about".

DETAILED DESCRIPTION OF THE INVENTION

Figure 1:
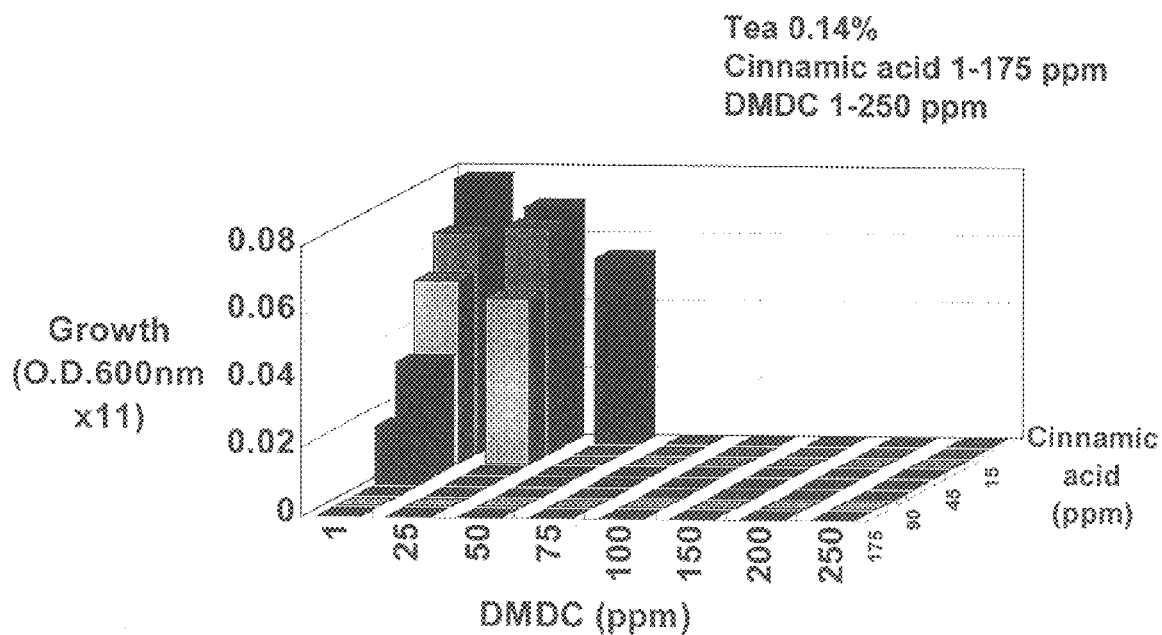
FIG. 1 shows the results of a control experiment of growth of yeast *Saccharomyces cerevisiae* X2180-1B in a matrix of tubes of Ready to Drink tea, 0.14% tea.

The ambient stable beverage of the present invention is preserved by a preservative system comprising cinnamic acid, dimethyl dicarbonate and at least one essential oil.

Cinnamic Acid

Cinnamic acid (3-phenyl-2-propenoic acid) is a well known flavouring agent for cakes, drinks, chewing gum and ice cream. Derived from cinnamon, which has long been added to foods, it is regarded in most countries as a useful and harmless flavouring. When dissolved in a tea based beverage cinnamic acid imparts a mild resinous odour resembling honey and flowers with a sweet and weak spicy taste. A flavouring effect is evident at concentrations above about 10 ppm. At concentrations above 30 ppm the flavour becomes particularly strong. An additional benefit is the suppression of unwanted preservative notes from chemicals such as sorbic and benzoic acids. Of the two stereo isomers that exist, the trans-isomer is more commonly of interest for use in flavouring.

Cinnamic acid was given GRAS (i.e. Generally Recognised as Safe) status by the FEMA (Flavouring Extract Manufacturers Association) in 1965. While there is no legislation in the European Union that prevents or limits the use of cinnamic acid in food or beverages, the normal usage maximum that has previously been agreed within the industry is 31 ppm. More recently 174.9 ppm has been allowed for non-alcoholic beverages.

A number of cinnamic acid derivatives are known and used in the food industry. These include p-dimethylaminocinnamate, cinnamaldehyde, cinnamyl acetate, cinnamyl alcohol, cinnamyl benzoate, cinnamyl cinnamate, cinnamyl formate, cinnamyl isobutyrate, cinnamyl isovalerate and cinnamyl phenylacetate. For the purposes of this invention one could substitute or combine cinnamic acid with one or more of its derivatives although one would need to consider the concentrations required to achieve desired results any impact on aroma and taste.

While not wanting to be bound by theory, the present inventors believe that cinnamic acid works as a membrane active compound that at low pH increases the concentration of the membrane soluble cinnamic acid, i.e. it does not function as a classic weak acid preservative.

The beverage of the present invention preferably contains 1 to 175 ppm cinnamic acid, more preferably 1 to 60 ppm, more especially 1 to 30 ppm.

Dimethyl Dicarbonate

Dimethyl dicarbonate is well known sterilant for soft drinks. It is also known as dimethyl pyrocarbonate or DMDC and is marketed by the Bayer AG under the trade name VELCORIN™. DMDC is a useful sterilant as upon addition it rapidly kills microbes. DMDC breaks down rapidly in aqueous environments so it poses no risk to the consumer. However it offers no long term preservative action. DMDC was approved for use as a yeast inhibitor in wines at the point of bottling by the United States Food and Drug Administration on Oct. 21, 1988. The EU cleared DMDC as a cold sterilant in 1989.

DMDC is known to be inefficient against mould contamination.

For the purposes of the present invention the preservative system should preferably contain between 1 and 500 ppm dimethyl dicarbonate, more preferably between 1 and 250 ppm dimethyl dicarbonate.

Essential Oil

The inventors tested a large number of antimicrobials and found the following to be suitable for use in the preservative system of the present invention. The minimum inhibitory concentration (MIC) is given for each compound.

TABLE I

Preferred essential oils

| COMPOUND | MIC (ppm) |
|---|---|
| Benzyl-4-hydroxybenzoate | 68 |
| 4-tert-Butylcyclohexanone | 462 |
| Carvone | 300 |
| Cinnamaldehyde | 66 |
| Citral | 228 |
| Citral dimethyl acetal | 198 |
| Citronellol | 125 |
| Cumic alcohol | 450 |
| Cyclohexanebutyric acid | 68 |
| 2-Cyclohexylethyl acetate | 102 |
| trans, trans-2,4-Decadienal | 8 |
| Decanal | 47 |
| Decanol | 24 |
| Dihydrocarveol | 540 |
| 3,7-Dimethyl-1-octanol | 15.8 |
| Ethyl cyclohexanepropionate | 184 |
| Ethyl pyruvate | 1392 |
| Ethyl vanillin | 249 |
| Jasmone | 246 |
| o-Methoxycinnamaldehyde | 130 |
| Methyl anthranilate | 310 |
| α-Methyl-trans-cinnamaldehyde | 58.4 |
| Methyl eugenol | 356 |
| Methyl nonanoate | 90 |
| 2-Methyl-2-pentenal | 1274 |
| 5-Methyl-2-phenyl-2-hexenal | 162 |
| Methyl salicylate | 152 |
| 4-Methyl-5-thiazoleethanol acetate | 1110 |
| Myrtenol | 137 |
| Neomenthol | 156 |
| Nonanoic acid | 63 |
| γ-Nonanoic lactone | 63 |
| δ-Octalactone | 568 |
| Octanoic acid (caprylic) | 115 |
| 1-Octanol | 247 |
| 1-Phenyl-1,2-propanedione | 222 |
| Piperonyl acetate | 242 |
| Propyl benzoate | 66 |
| Pulegone | 152 |
| Sorbic aldehyde (2,4-hexadienal) | 86 |
| Terpinen-4-ol | 616 |
| Tolualdehyde | 240 |
| γ-Undecalactone | 28 |
| Undecanal | 34 |
| 1-Undecanol | 14 |
| Vanillin | 1216 |

The preservative system preferably contains 1 to 100 ppm of at least one essential oil. More preferably the preservative system contains 1 to 50 ppm of at least one essential oil, more especially 1 to 32.5 ppm.

Some of the aforementioned essential oils were found to be particularly preferred in respect of their impact on the taste profile of tea based beverages containing them. These are listed in Table II below. In each case the respective minimum inhibitory concentration (MIC) and their specific preferred concentration is also given.

TABLE II

Particularly preferred essential oils

| COMPOUND | MIC (ppm) | Conc (ppm) |
|---|---|---|
| Citral | 228 | 1–30 |
| Citral dimethyl acetal | 198 | 1–30 |
| Cumic alcohol | 450 | 1–40 |
| trans,trans-2,4-Decadienal | 8 | 1–20 |
| 3,7-Dimethyl-1-octanol | 15.8 | 1–20 |
| Ethyl pyruvate | 1392 | 1–40 |
| Myrtenol | 137 | 1–20 |
| Piperonyl acetate | 242 | 1–20 |

Tea Extract

The tea extract can be obtained by any suitable means. Preferably tea leaves are extracted in hot water over a period of between 20 minutes and 5 hours. The extract can be dried to form a powder, reconstituted to form an acidic beverage, or concentrated to form a syrup from which one can prepare a tea based beverage.

Tea is known to have certain antibacterial and antiviral properties in itself. One must exceed a concentration of about 3% to evidence tea beginning to suppress the growth of yeasts and moulds. At concentrations lower than this, which is typical for tea based beverages, tea acts as a nutrient that enhances the potential for microbial spoilage. The beverage should therefore contain 0.01 to 3% tea solids, about 0.14% being particularly preferred.

Other Factors

Water quality can seriously undermine the stability of a beverage. This is an important factor when making a tea based beverage for cold filing. For that purpose it will often be important to minimise the yeast content of water used at all stages of production. Art known methods include chlorination/dechlorination and UV irradiation.

Ambient-stable beverages of the invention may be still or carbonated. Carbonation appears to provide a preservative effect in itself and therefore the formulation of a carbonated product need not be the same as a still one.

Tea based beverages commonly contain sugar or some other sweetener to counter the sometimes astringent taste of tea. Most microbes that can typically grow in tea based beverages thrive on sugar, a source of nitrogen, oxygen, zinc, magnesium, potassium, phosphate and vitamins. It is therefore advantageous to limit the sugar content to 8 to 10 degrees brix, however one could use up to 60 degrees brix when the product is a tea mix.

Oxygen content can be minimised by pre-pasteurisation or some heat treatment or nitrogen sparging. The mineral content of a tea based beverage can be minimised using EDTA, citrate, or a water softener. For example microbes can grow in tea if the concentration of magnesium ions exceeds 0.2 ppm, and they only need trace levels of zinc.

If desired the preservative system can also include ascorbic acid, a well known preservative for foodstuffs that is known to most as vitamin C.

The present invention also relates to a method for preparing an ambient-stable tea based beverage suitable for cold filing. The method comprises adding cinnamic acid, dimethyl dicarbonate and at least one essential oil to a tea extract.

Cinnamic acid is freely soluble in essential oils, benzene, ether, acetone, glacial acetic acid and carbon disulphide. However cinnamic acid is not readily soluble in tea and one would not want to contaminate a tea based beverages with any of the aforementioned chemicals. While the preservative system of the present invention includes one or more essential oils, it may be necessary to include a solubility enhancing step before adding the cinnamic acid to the tea solution. That can be achieved by spray drying the cinnamic acid onto a carrier powder (which may optionally be sugar based) and adding the powder to the tea, converting the acid to its salt, or dissolving the cinnamic acid in a small quantity of organic solvent such as ethanol, or propylene glycol. One could spray dry the essential in the same way.

The ambient stable beverage of the present invention will now be described in the following examples with reference to the accompanying Figures.

EXAMPLE 1
Ready to Drink Tea Experiments

FIG. 1 shows the results of a control experiment of growth of yeast *Saccharomyces cerevisiae* X2180-1B in a matrix of tubes of Ready to Drink tea, 0.14% tea. The matrix of 30 ml tubes each contained 10 ml RTD tea, pH 3.4, containing 1–175 ppm cinnamic acid. Tubes were inoculated with $10^4$ cells of the yeast *Saccharomyces cerevisiae* X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Figure 2:
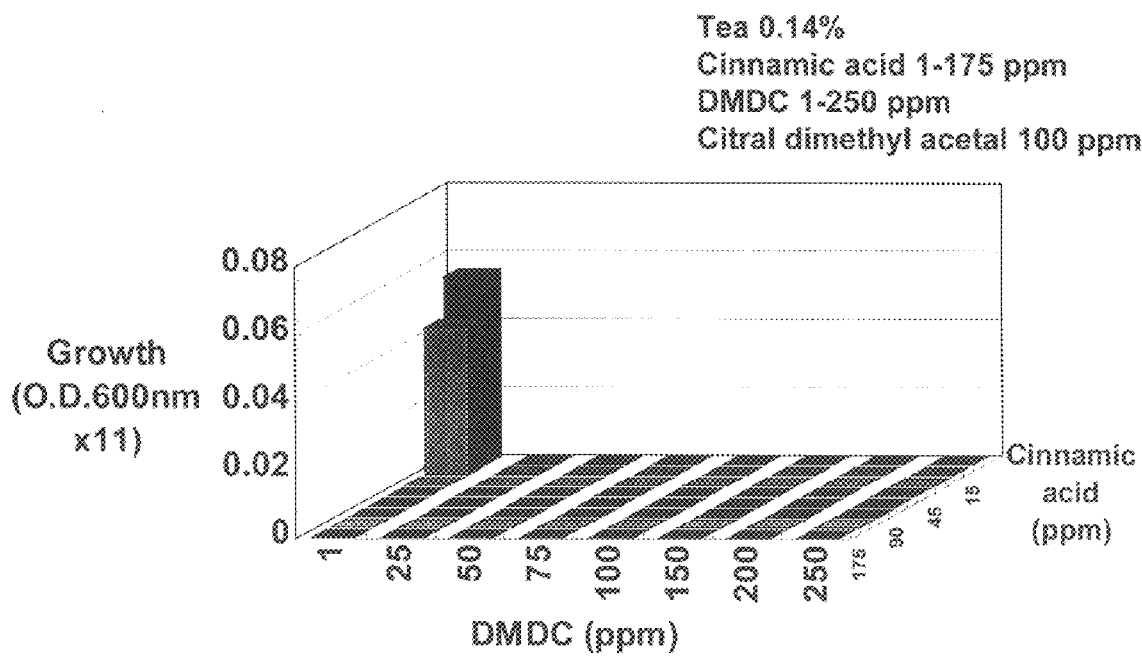
FIG. 2 shows the combined effect of citral dimethyl acetal, cinnamic acid and DMDC on growth of yeast *Saccharomyces cerevisiae* X2180-1B in a matrix of tubes of Ready to Drink tea, 0.14% tea.

FIG. 2 shows the combined effect of citral dimethyl acetal, cinnamic acid and DMDC on growth of yeast *Saccharomyces cerevisiae* X2180-1B in a matrix of tubes of Ready to Drink tea, 0.14% tea. The matrix of 30 ml tubes each containing 10 mls RTD tea pH 3.4, all contained 100 ppm citral dimethyl acetal and 1–175 ppm cinnamic acid. Tubes were inoculated with $10^4$ cells of the yeast *Saccharomyces cerevisiae* X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil component, citral dimethyl acetal.

Figure 3:
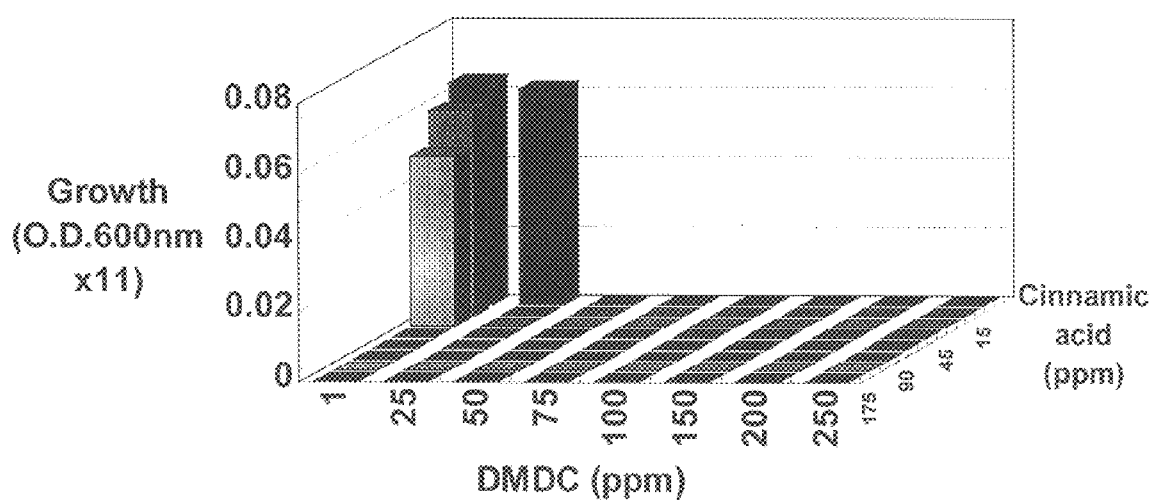
FIG. 3 shows the combined effect of cumic alcohol, cinnamic acid and DMDC on growth of yeast *Saccharomyces cerevisiae* X2180-1B in a matrix of tubes of Ready to Drink tea, 0.14% tea.

FIG. 3 shows the combined effect of cumic alcohol, cinnamic acid and DMDC on growth of yeast *Saccharomyces cerevisiae* X2180-1B in a matrix of tubes of Ready to Drink tea, 0.14% tea. The matrix of 30 ml tubes each containing 10 mls RTD tea pH 3.4, all contained 100 ppm cumic alcohol and 1–175 ppm cinnamic acid. Tubes were inoculated with $10^4$ cells of the yeast *Saccharomyces cerevisiae* X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil component, cumic alcohol.

Figure 4:
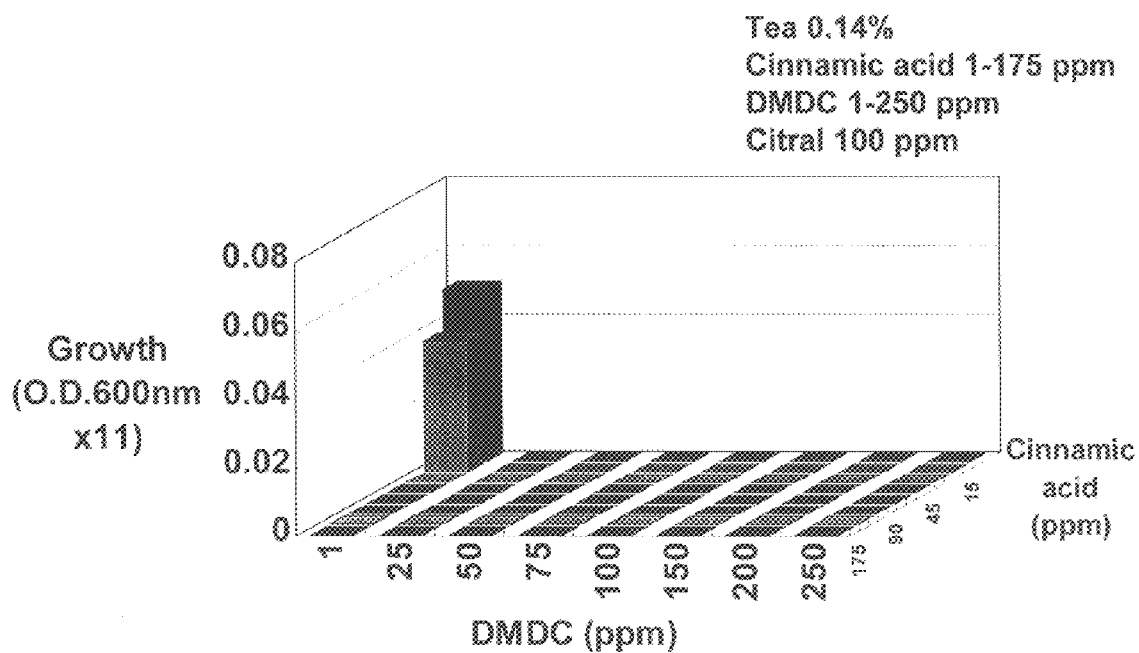
FIG. 4 shows the combined effect of citral, cinnamic acid and DMDC on growth of yeast *Saccharomyces cerevisiae* X2180-1B in a matrix of tubes of Ready to Drink tea, 0.14% tea.

FIG. 4 shows the combined effect of citral, cinnamic acid and DMDC on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 100 ppm citral and 1–175 ppm cinnamic acid. Tubes were inoculated with $10^4$ cells of the yeast *Saccharomyces cerevisiae* X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil component, citral.

Figure 5:
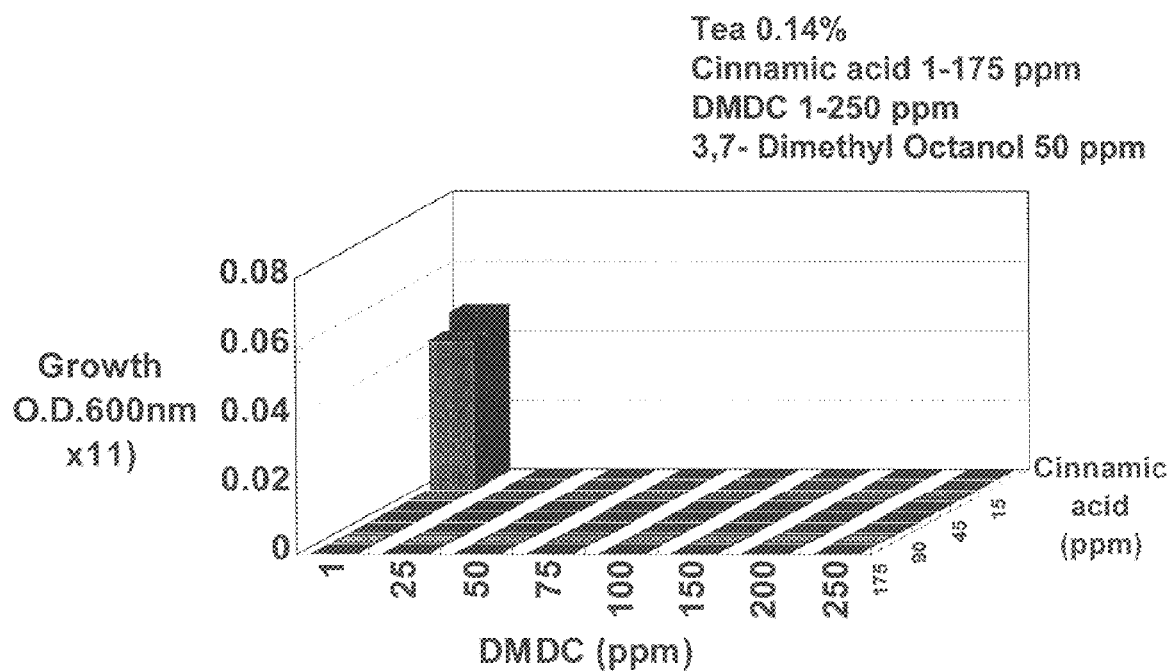
FIG. 5 shows the combined effect of 3,7-dimethyl octanol, cinnamic acid and DMDC on growth of yeast *Saccharomyces cerevisiae* X2180-1B in a matrix of tubes of Ready to Drink tea, 0.14% tea.

FIG. 5 shows the combined effect of 3,7-dimethyl octanol, cinnamic acid and DMDC on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 50 ppm 3,7-dimethyl octanol and 1–175 ppm cinnamic acid. Tubes were inoculated with $10^4$ cells of the yeast *Saccharomyces cerevisiae* X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil component, 3,7-dimethyl octanol.

Figure 6:
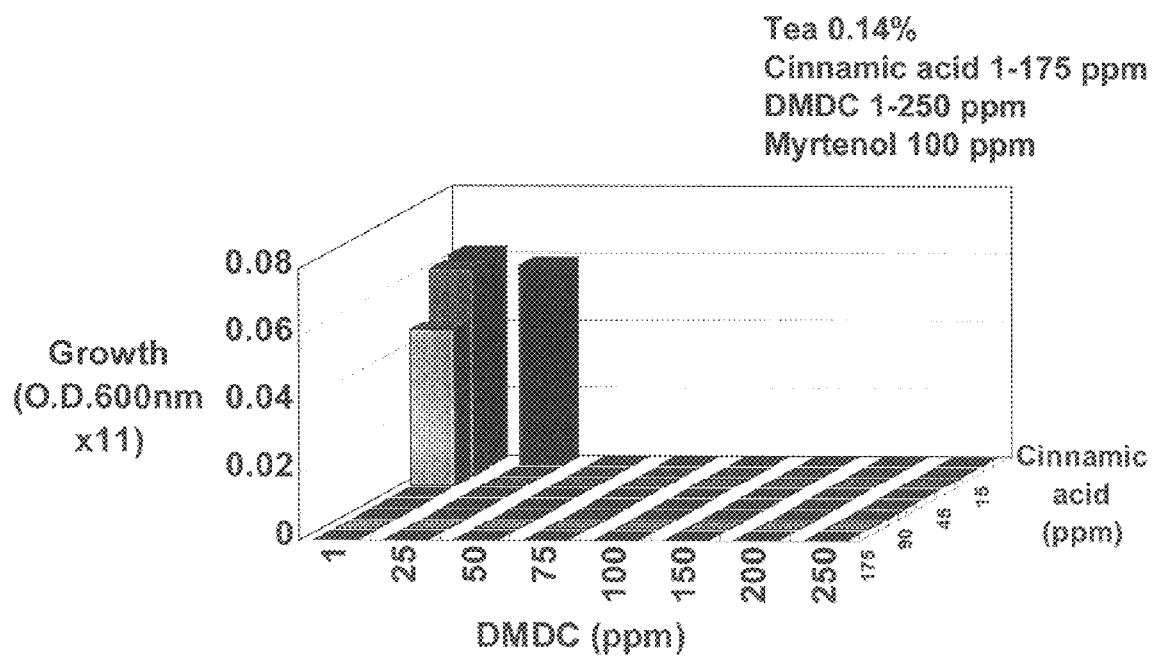
FIG. 6 shows the combined effect of myrtenol, cinnamic acid and DMDC on growth of yeast *Saccharomyces cerevisiae* X2180-1B in a matrix of tubes of Ready to Drink tea, 0.14% tea.

FIG. 6 shows the combined effect of myrtenol, cinnamic acid and DMDC on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 100 ppm myrtenol and 1–175 ppm cinnamic acid. Tubes were inoculated with $10^4$ cells of the yeast *Saccharomyces cerevisiae* X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil component, myrtenol.

Figure 7:
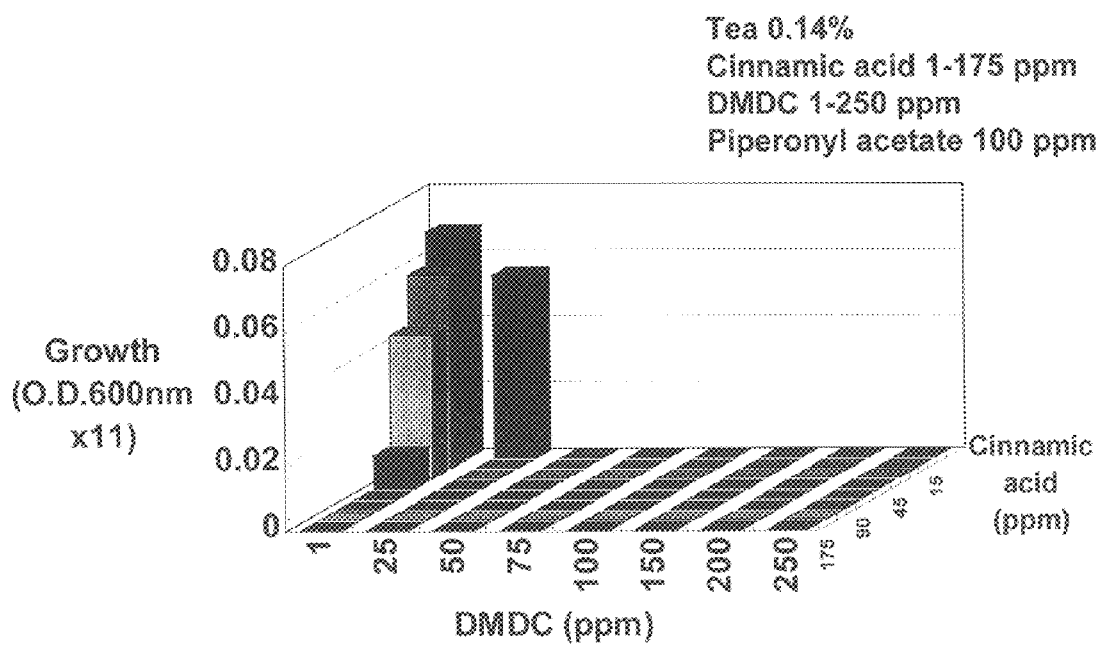
FIG. 7 shows the combined effect of piperonyl acetate, cinnamic acid and DMDC on growth of yeast *Saccharomyces cerevisiae* X2180-1B in a matrix of tubes of Ready to Drink tea, 0.14% tea.

FIG. 7 shows the combined effect of piperonyl acetate, cinnamic acid and DMDC on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 100 ppm piperonyl acetate and 1–175 ppm cinnamic acid. Tubes were inoculated with $10^4$ cells of the yeast *Saccharomyces cerevisiae* X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil component, piperonyl acetate.

Figure 8:
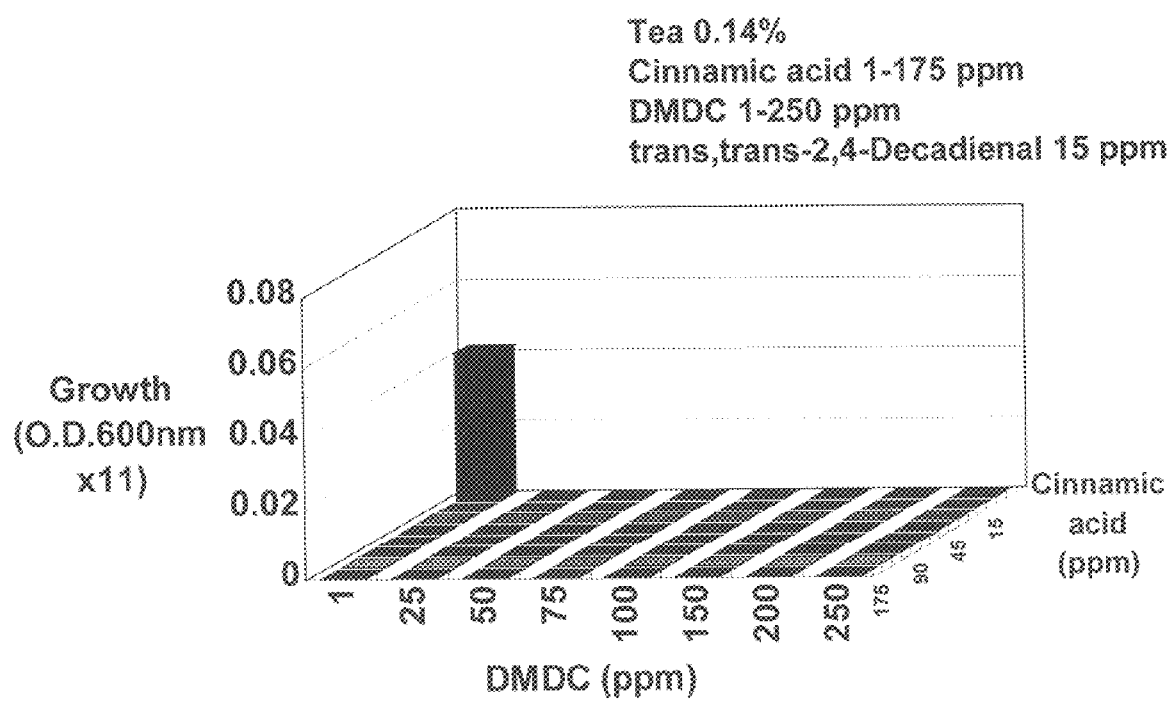
FIG. 8 shows the combined effect of trans,trans-2,4-decadienal, cinnamic acid and DMDC on growth of yeast *Saccharomyces cerevisiae* X2180-1B in a matrix of tubes of Ready to Drink tea, 0.14% tea.

FIG. 8 shows the combined effect of trans,trans-2,4-decadienal, cinnamic acid and DMDC on growth of yeast *Saccharomyces cerevisiae* X2180-1B in a matrix of tubes of Ready to Drink tea, 0.14% tea. The matrix of 30 ml tubes each contained 10 ml RTD tea pH 3.4, all contained 15 ppm trans,trans-2,4-decadienal and 1–175 ppm cinnamic acid. Tubes were inoculated with $10^4$ cells of the yeast *Saccharomyces cerevisiae* X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil component, trans,trans-2,4-decadienal.

Figure 9:
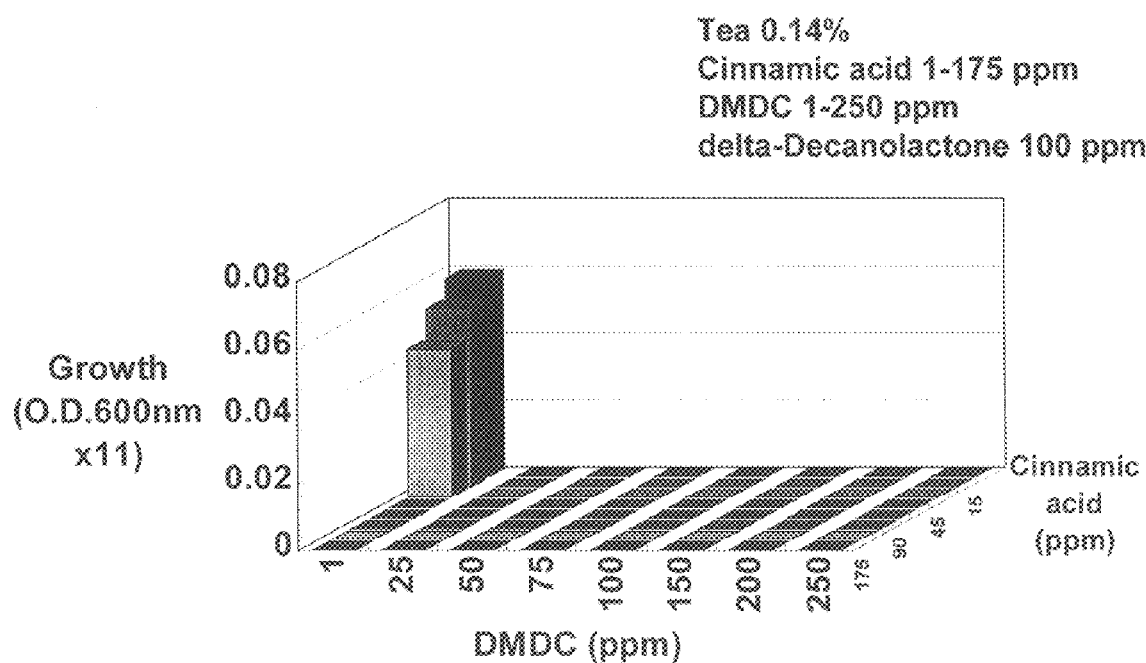
FIG. 9 shows the combined effect of δ-decanolactone, cinnamic acid and DMDC on growth of yeast *Saccharomyces cerevisiae* X2180-1B in a matrix of tubes of Ready to Drink tea, 0.14% tea.

FIG. 9 shows the combined effect of δ-decanolactone, cinnamic acid and DMDC on growth of yeast *Saccharomy-* ces cerevisiae X2180-1B in a matrix of tubes of Ready to Drink tea, 0.14% tea. The matrix of 30 ml tubes each containing 10 ml RTD tea pH 3.4, all contained 100 ppm δ-decanolactone and 1–175ppm cinnamic acid. Tubes were inoculated with $10^4$ cells of the yeast Saccharomyces cerevisiae X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil component, δ-decanolactone.

Figure 10:
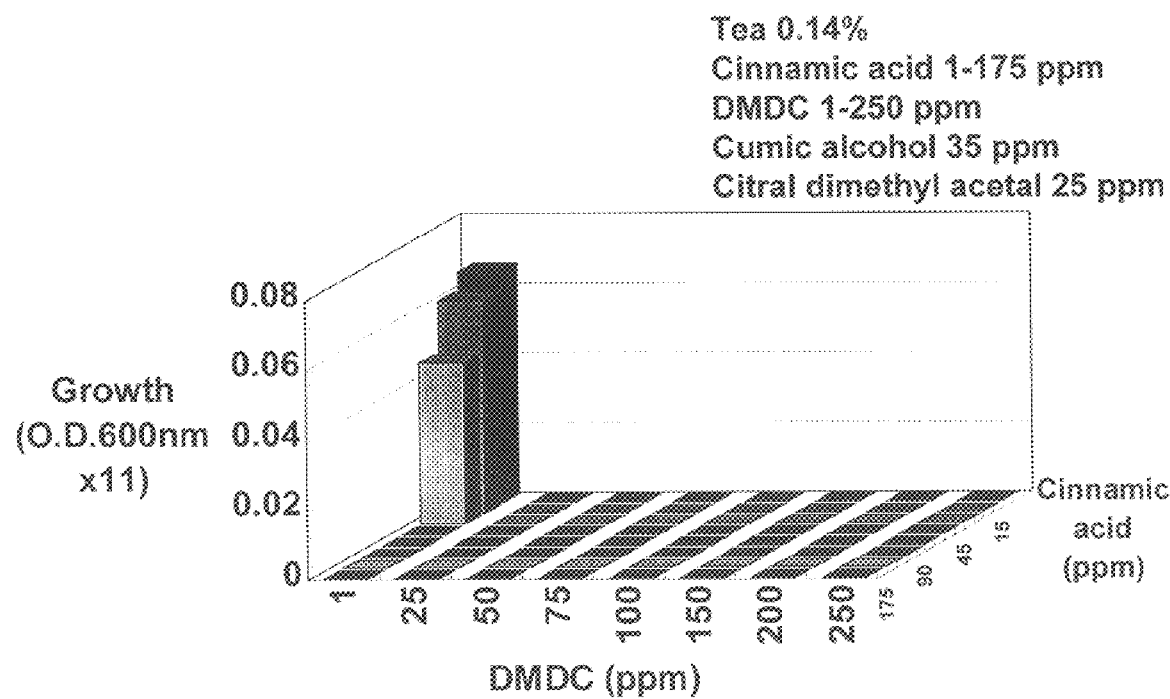
FIG. 10 shows the combined effect of citral dimethyl acetal, cumic alcohol, cinnamic acid and DMDC on growth of yeast *Saccharomyces cerevisiae* X2180-1B in a matrix of tubes of Ready to Drink tea, 0.14% tea.

FIG. 10 shows the combined effect of citral dimethyl acetal, cumic alcohol, cinnamic acid and DMDC on growth of yeast Saccharomyces cerevisiae X2180-1B in a matrix of tubes of Ready to Drink tea, 0.14% tea. The matrix of 30 ml tubes each containing 10 ml RTD tea pH 3.4, all contained 25 ppm citral dimethyl acetal, 35 ppm cumic alcohol and 1–175 ppm cinnamic acid. Tubes were inoculated with $10^4$ cells of the yeast Saccharomyces cerevisiae X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil components, citral dimethyl acetal and cumic alcohol.

EXAMPLE 2
Synthetic Soft Drink Experiments

Figure 11:
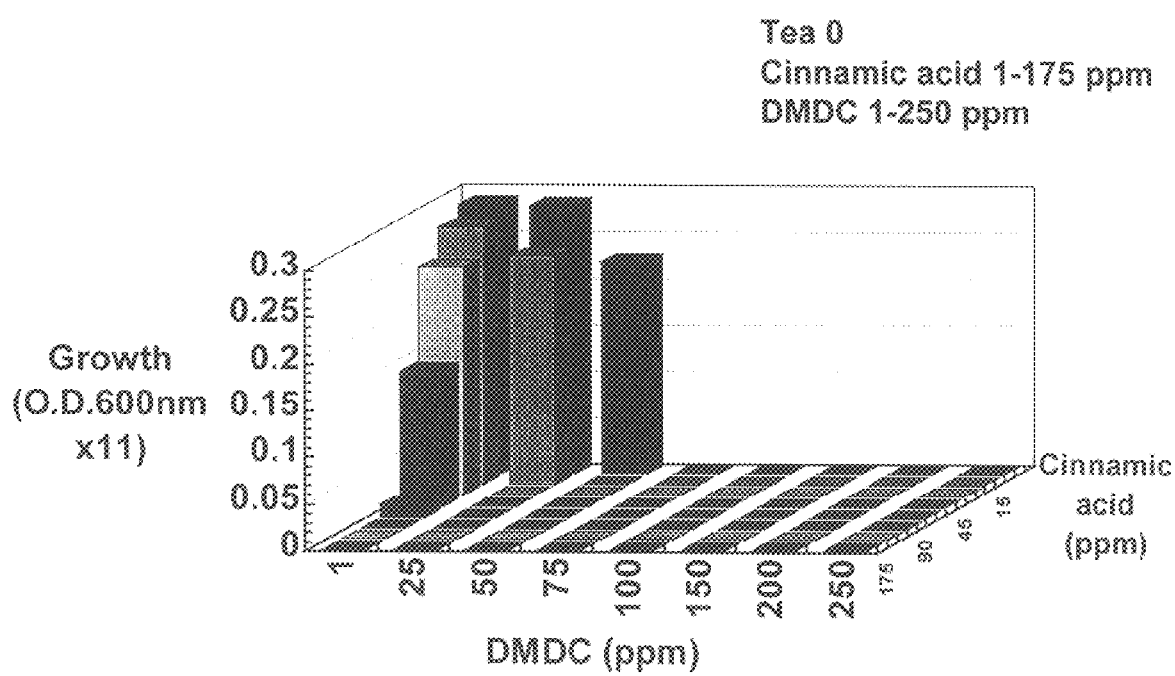
FIG. 11 gives the results of a control experiment of growth of yeast *Saccharomyces cerevisiae* X2180-1B in a matrix of tubes of synthetic soft drink, 0% tea.

FIG. 11 gives the results of a control experiment of growth of yeast Saccharomyces cerevisiae X2180-1B in a matrix of tubes of synthetic soft drink, 0% tea. Synthetic soft drink contained glucose, 8%w/v, citric acid 3 g/l, potassium orthophosphate 1 g/l, magnesium chloride 0.1 g/g and yeast extract 0.1 g/l. The matrix of 30 ml tubes each contained 10 ml soft drink, pH 3.4, containing 1–175 ppm cinnamic acid. Tubes were inoculated with $10^4$ cells of the yeast Saccharomyces cerevisiae X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Figure 12:
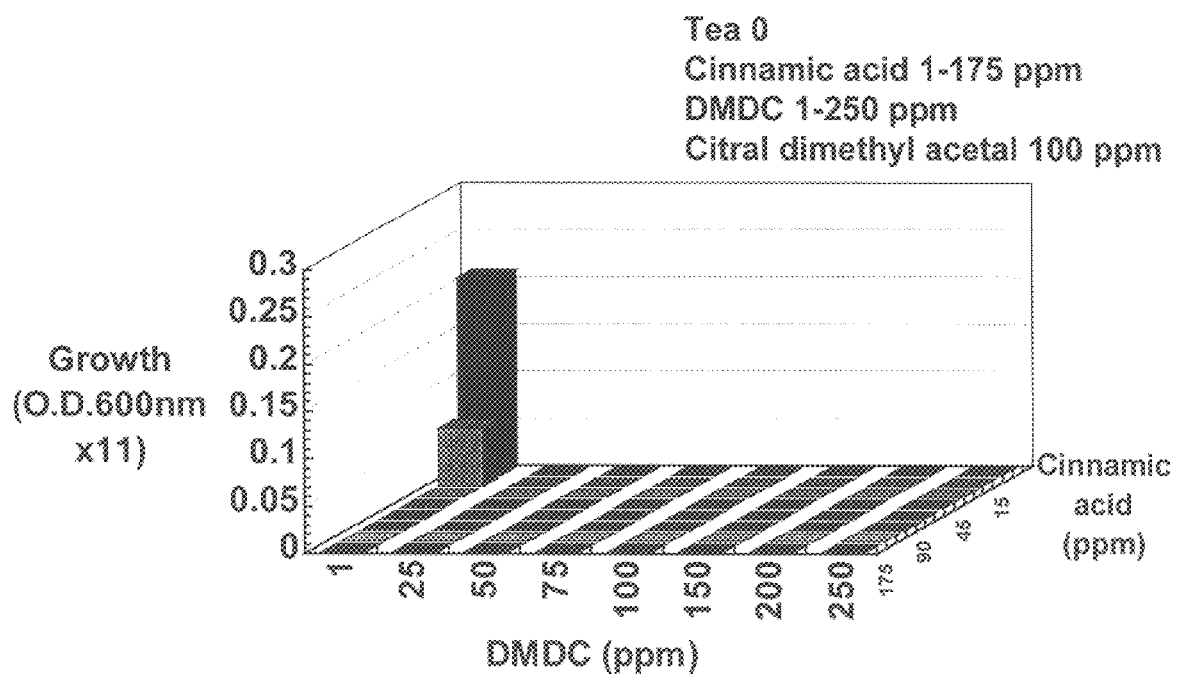
FIG. 12 shows the combined effect of citral dimethyl acetal, cinnamic acid and DMDC on growth of yeast *Saccharomyces cerevisiae* X2180-1B in a matrix of tubes of synthetic soft drink, 0% tea.

FIG. 12 shows the combined effect of citral dimethyl acetal, cinnamic acid and DMDC on growth of yeast Saccharomyces cerevisiae X2180-1B in a matrix of tubes of synthetic soft drink, 0% tea. Synthetic soft drink contained glucose, 8%w/v, citric acid 3 g/l, potassium orthophosphate 1 g/l, magnesium chloride 0.1 g/g and yeast extract 0.1 g/l. The matrix of 30 ml tubes each containing 10 ml RTD tea pH 3.4, all contained 100 ppm citral dimethyl acetal and 1–175 ppm cinnamic acid. Tubes were inoculated with $10^4$ cells of the yeast Saccharomyces cerevisiae X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 11 shows very substantially fewer tubes supporting yeast growth in the presence of the essential oil component, citral dimethyl acetal.

Figure 13:
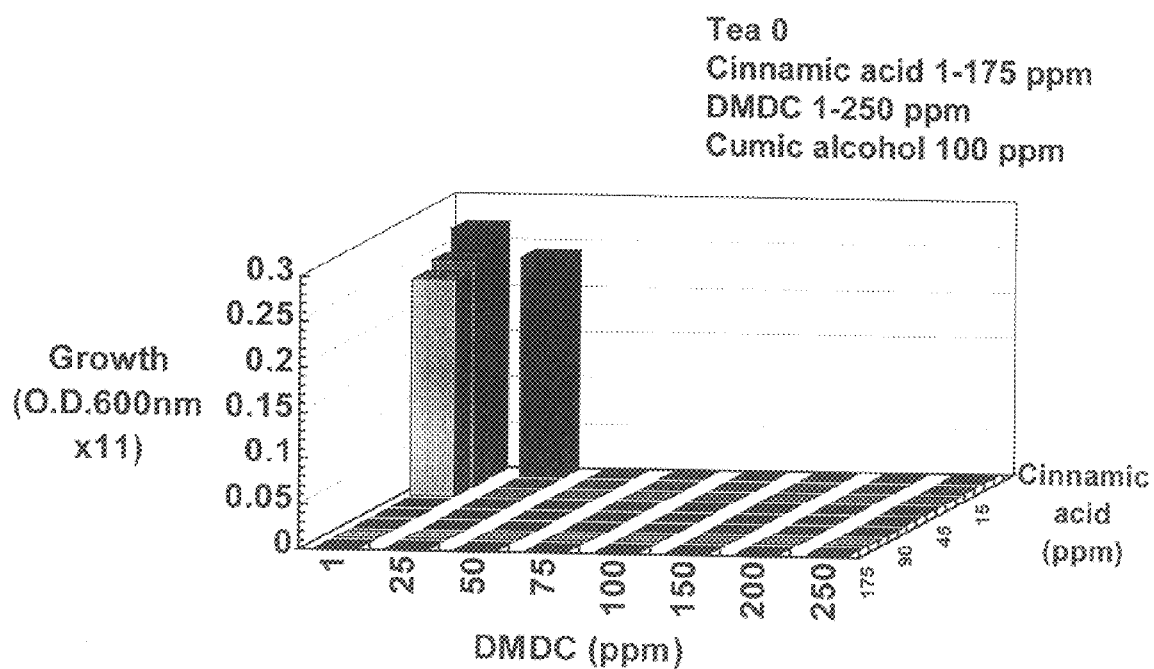
FIG. 13 shows the combined effect of cumic alcohol, cinnamic acid and DMDC on growth of yeast *Saccharomyces cerevisiae* X2180-1B in a matrix of tubes of synthetic soft drink, 0% tea.

FIG. 13 shows the combined effect of cumic alcohol, cinnamic acid and DMDC on growth of yeast Saccharomyces cerevisiae X2180-1B in a matrix of tubes of synthetic soft drink, 0% tea. Synthetic soft drink contained glucose, 8%w/v, citric acid 3 g/l, potassium orthophosphate 1 g/l, magnesium chloride 0.1 g/g and yeast extract 0.1 g/l. The matrix of 30 ml tubes each containing 10 ml RTD tea pH 3.4, all contained 100 ppm cumic alcohol and 1–175 ppm cinnamic acid. Tubes were inoculated with $10^4$ cells of the yeast Saccharomyces cerevisiae X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 11 shows very substantially fewer tubes supporting yeast growth in the presence of the essential oil component, cumic alcohol.

Figure 14:
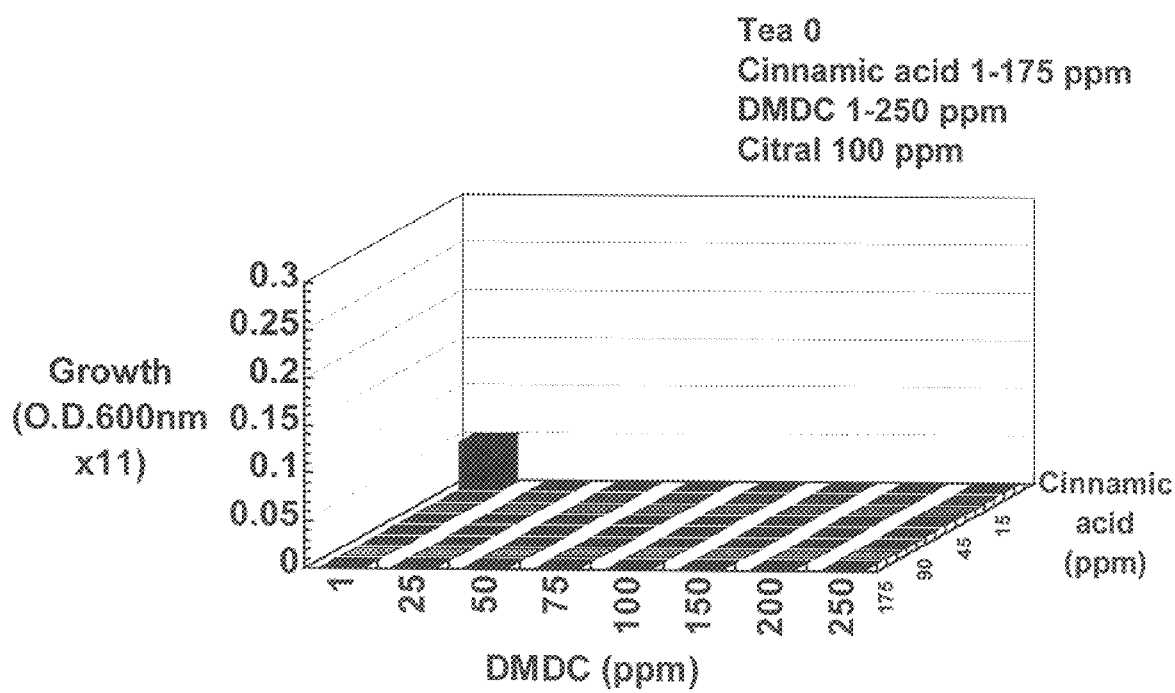
FIG. 14 shows the combined effect of citral, cinnamic acid and DMDC on growth of yeast *Saccharomyces cerevisiae* X2180-1B in a matrix of tubes of synthetic soft drink, 0% tea.

FIG. 14 shows the combined effect of citral, cinnamic acid and DMDC on growth of yeast Saccharomyces cerevisiae X2180-1B in a matrix of tubes of synthetic soft drink, 0% tea. Synthetic soft drink contained glucose, 8%w/v, citric acid 3 g/l, potassium orthophosphate 1 g/l, magnesium chloride 0.1 g/g and yeast extract 0.1 g/l. The matrix of 30 ml tubes each containing 10 ml RTD tea pH 3.4, all contained 100 ppm citral and 1–175 ppm cinnamic acid. Tubes were inoculated with $10^4$ cells of the yeast Saccharomyces cerevisiae X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 11 shows very substantially fewer tubes supporting yeast growth in the presence of the essential oil component, citral.

Figure 15:
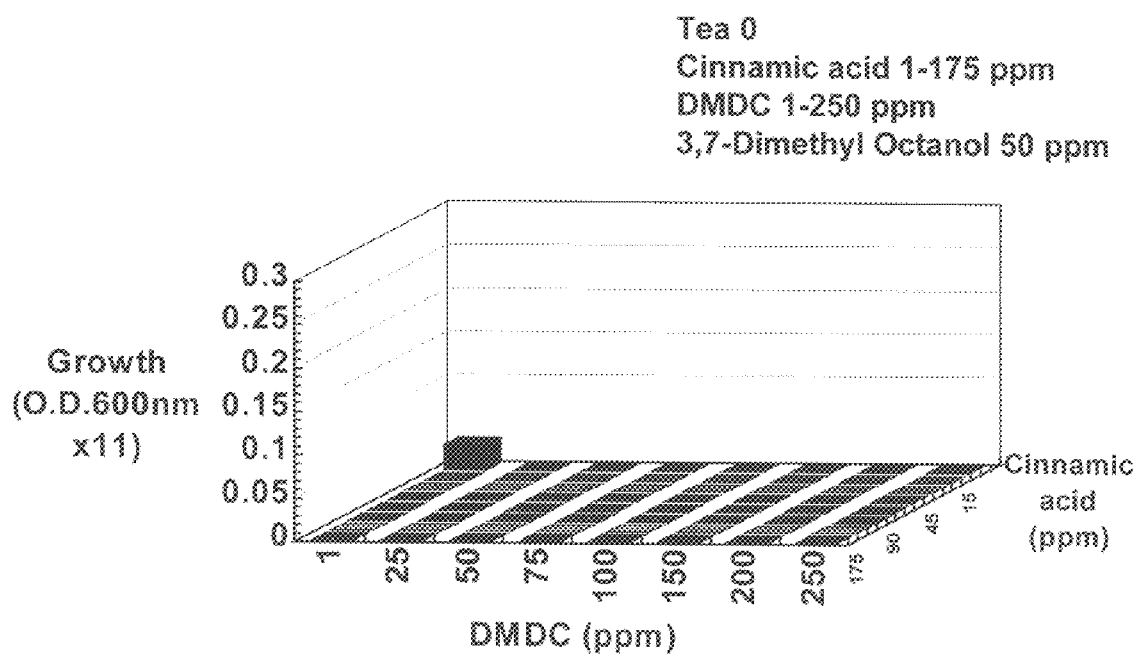
FIG. 15 shows the combined effect of 3,7-dimethyl octanol, cinnamic acid and DMDC on growth of yeast *Saccharomyces cerevisiae* X2180-1B in a matrix of tubes of synthetic soft drink, 0% tea.

FIG. 15 shows the combined effect of 3,7-dimethyl octanol, cinnamic acid and DMDC on growth of yeast Saccharomyces cerevisiae X2180-1B in a matrix of tubes of synthetic soft drink, 0% tea. Synthetic soft drink contained glucose, 8%w/v, citric acid 3 g/l, potassium orthophosphate 1 g/l, magnesium chloride 0.1 g/g and yeast extract 0.1 g/l. The matrix of 30 ml tubes each containing 10 ml RTD tea pH 3.4, all contained 50 ppm 3,7-dimethyl octanol and 1–175 ppm cinnamic acid. Tubes were inoculated with $10^4$ cells of the yeast Saccharomyces cerevisiae X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 11 shows very substantially fewer tubes supporting yeast growth in the presence of the essential oil component, 3,7-dimethyl octanol.

Figure 16:
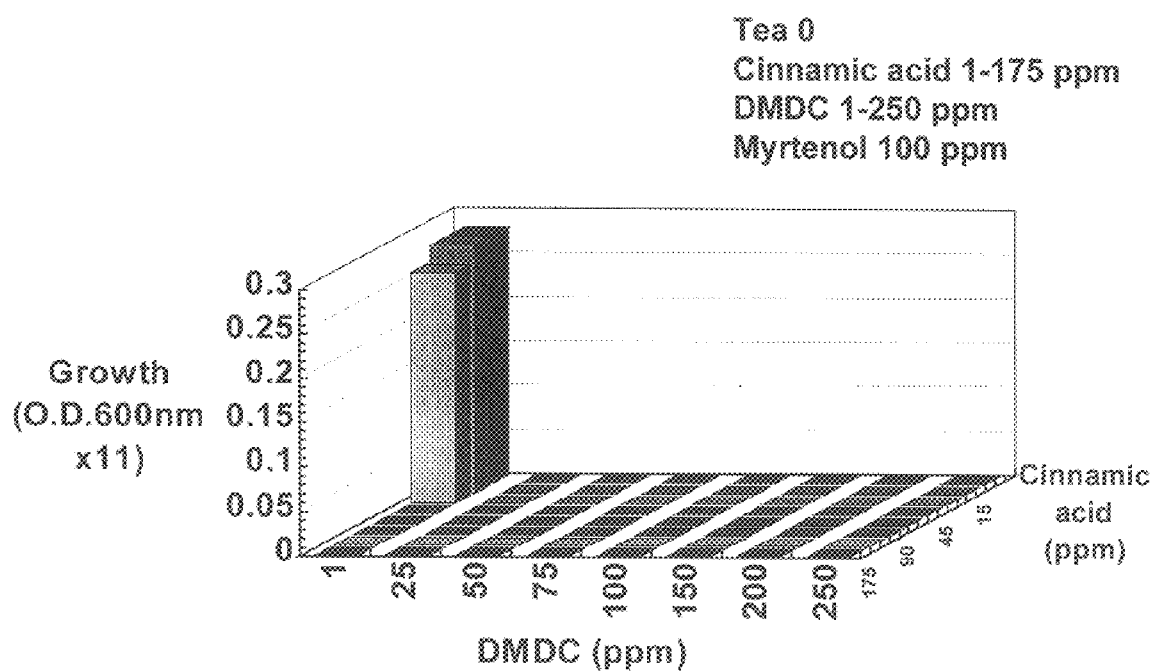
FIG. 16 shows the combined effect of myrtenol, cinnamic acid and DMDC on growth of yeast *Saccharomyces cerevisiae* X2180-1B in a matrix of tubes of synthetic soft drink, 0% tea.

FIG. 16 shows the combined effect of myrtenol, cinnamic acid and DMDC on growth of yeast Saccharomyces cerevisiae X2180-1B in a matrix of tubes of synthetic soft drink, 0% tea. Synthetic soft drink contained glucose, 8%w/v, citric acid 3 g/l, potassium orthophosphate 1 g/l, magnesium chloride 0.1 g/g and yeast extract 0.1 g/l. The matrix of 30 ml tubes each containing 10 ml RTD tea pH 3.4, all contained 100 ppm myrtenol and 1–175 ppm cinnamic acid. Tubes were inoculated with $10^4$ cells of the yeast Saccharomyces cerevisiae X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 11 shows very substantially fewer tubes supporting yeast growth in the presence of the essential oil component, myrtenol.

Figure 17:
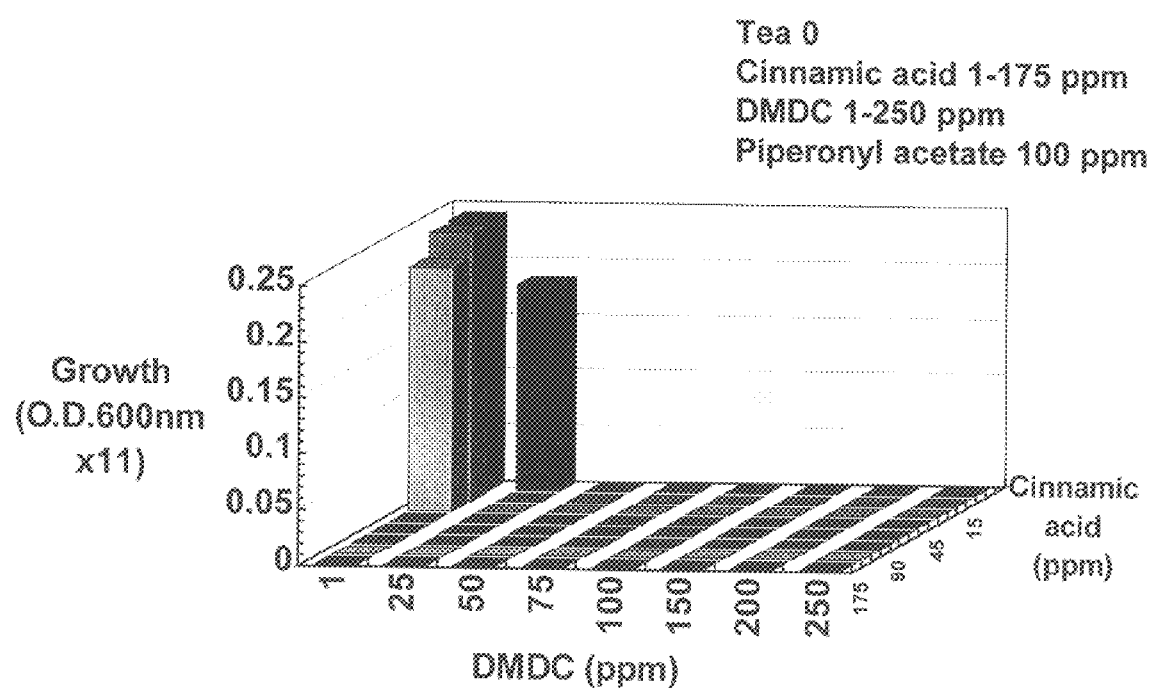
FIG. 17 shows the combined effect of piperonyl acetate, cinnamic acid and DMDC on growth of yeast *Saccharomyces cerevisiae* X2180-1B in a matrix of tubes of synthetic soft drink, 0% tea.

FIG. 17 shows the combined effect of piperonyl acetate, cinnamic acid and DMDC on growth of yeast *Saccharomyces cerevisiae* X2180-1B in a matrix of tubes of synthetic soft drink, 0% tea. Synthetic soft drink contained glucose, 8%w/v, citric acid 3 g/l, potassium orthophosphate 1 g/l, magnesium chloride 0.1 g/g and yeast extract 0.1 g/l. The matrix of 30 ml tubes each containing 10 ml RTD tea pH 3.4, all contained 100 ppm piperonyl acetate and 1–175 ppm cinnamic acid. Tubes were inoculated with $10^4$ cells of the yeast *Saccharomyces cerevisiae* X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 11 shows very substantially fewer tubes supporting yeast growth in the presence of the essential oil component, piperonyl acetate.

Figure 18:
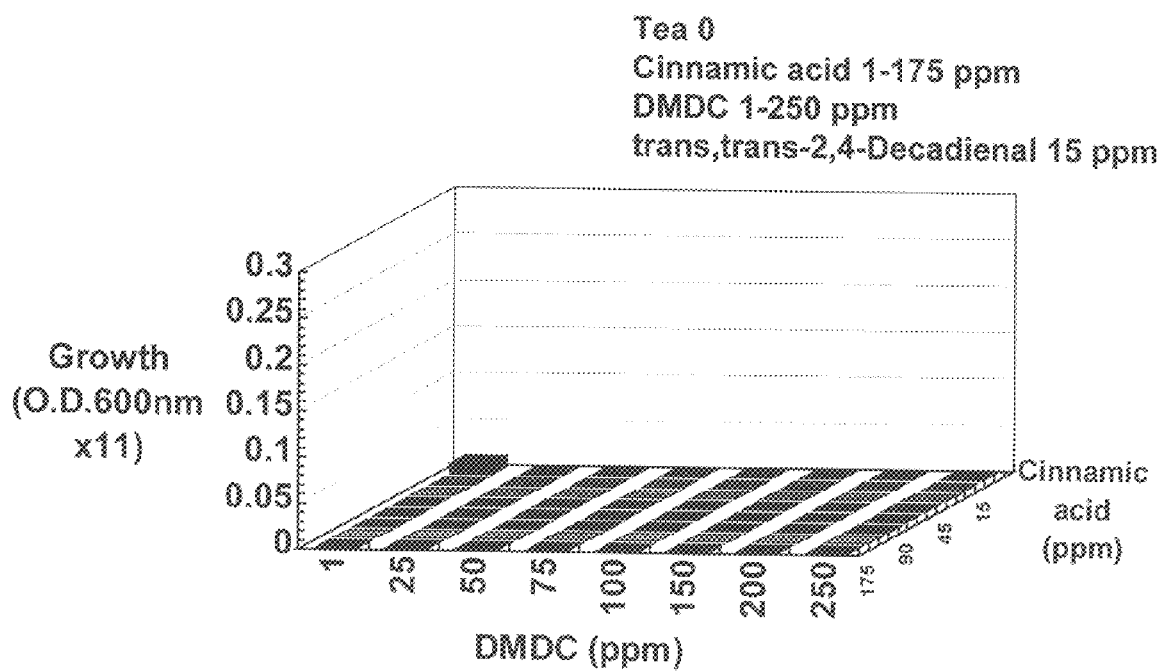
FIG. 18 shows the combined effect of trans,trans-2,4-decadienal, cinnamic acid and DMDC on growth of yeast *Saccharomyces cerevisiae* X2180-1B in a matrix of tubes of synthetic soft drink, 0% tea.

FIG. 18 shows the combined effect of trans,trans-2,4-decadienal, cinnamic acid and DMDC on growth of yeast *Saccharomyces cerevisiae* X2180-1B in a matrix of tubes of synthetic soft drink, 0% tea. Synthetic soft drink contained glucose, 8%w/v, citric acid 3 g/l, potassium orthophosphate 1 g/l, magnesium chloride 0.1 g/g and yeast extract 0.1 g/l. The matrix of 30 ml tubes each containing 10 ml RTD tea pH 3.4, all contained 15 ppm trans,trans-2,4-decadienal and 1–175 ppm cinnamic acid. Tubes were inoculated with $10^4$ cells of the yeast *Saccharomyces cerevisiae* X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 11 shows very substantially fewer tubes supporting yeast growth in the presence of the essential oil component, trans,trans-2,4-decadienal.

Figure 19:
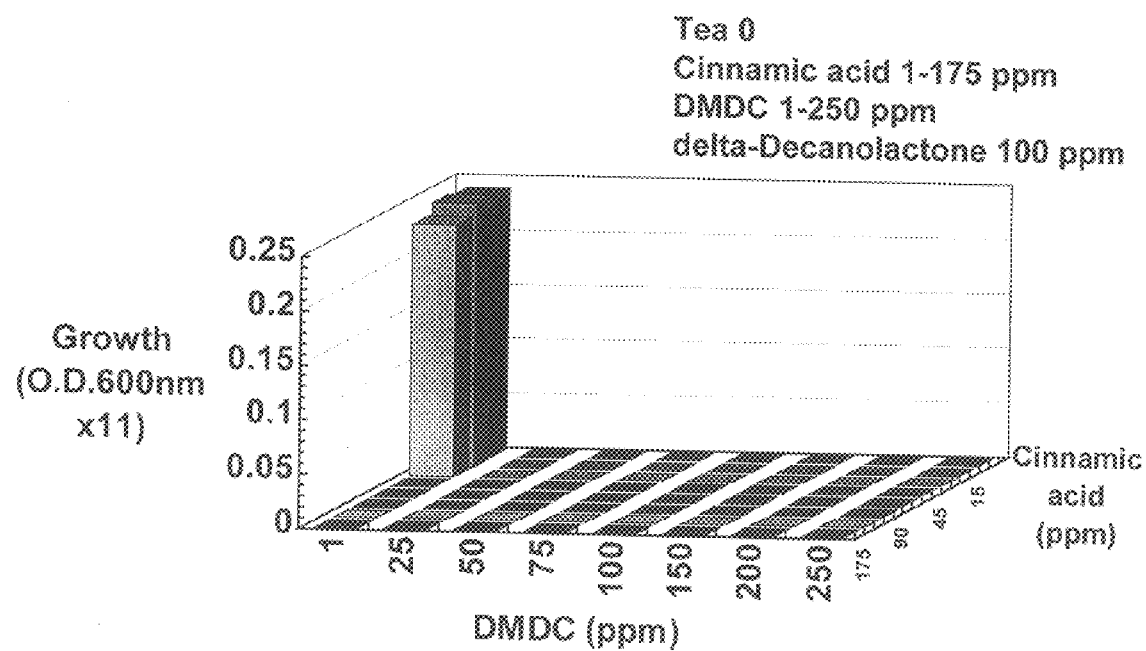
FIG. 19 shows the combined effect of δ-decanolactone, cinnamic acid and DMDC on growth of yeast *Saccharomyces cerevisiae* X2180-1B in a matrix of tubes of synthetic soft drink, 0% tea.

FIG. 19 shows the combined effect of δ-decanolactone, cinnamic acid and DMDC on growth of yeast *Saccharomyces cerevisiae* X2180-1B in a matrix of tubes of synthetic soft drink, 0% tea. Synthetic soft drink contained glucose, 8%w/v, citric acid 3 g/l, potassium orthophosphate 1 g/l, magnesium chloride 0.1 g/g and yeast extract 0.1 g/l. The matrix of 30 ml tubes each containing 10 ml RTD tea pH 3.4, all contained 100 ppm δ-decanolactone and 1–175 ppm cinnamic acid. Tubes were inoculated with $10^4$ cells of the yeast *Saccharomyces cerevisiae* X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 11 shows very substantially fewer tubes supporting yeast growth in the presence of the essential oil component, δ-decanolactone.

Figure 20:
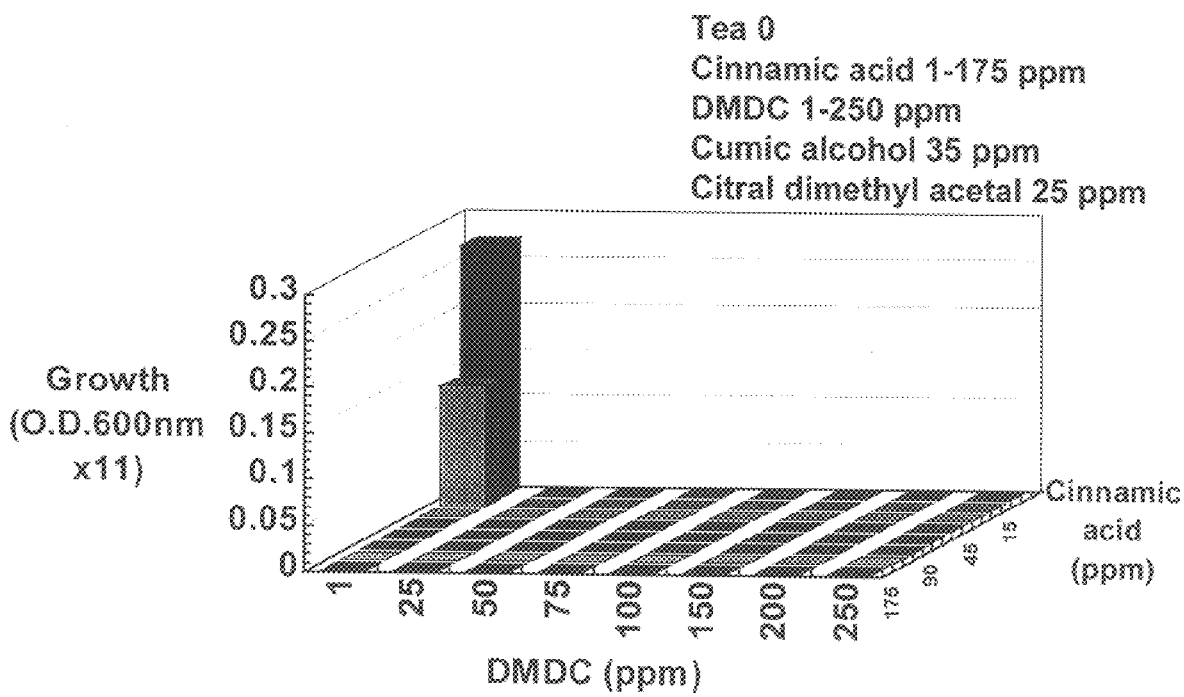
FIG. 20 shows the combined effect of citral dimethyl acetal, cumic alcohol, cinnamic acid and DMDC on growth of yeast *Saccharomyces cerevisiae* X2180-1B in a matrix of tubes of synthetic soft drink, 0% tea.

FIG. 20 shows the combined effect of citral dimethyl acetal, cumic alcohol, cinnamic acid and DMDC on growth of yeast *Saccharomyces cerevisiae* X2180-1B in a matrix of tubes of synthetic soft drink, 0% tea. Synthetic soft drink contained glucose, 8%w/v, citric acid 3 g/l, potassium orthophosphate 1 g/l, magnesium chloride 0.1 g/g and yeast extract 0.1 g/l. The matrix of 30 ml tubes each containing 10 ml RTD tea pH 3.4, all contained 25 ppm citral dimethyl acetal, 35 ppm cumic alcohol and 1–175 ppm cinnamic acid. Tubes were inoculated with $10^4$ cells of the yeast *Saccharomyces cerevisiae* X2180-1B. Immediately following inoculation, dimethyl dicarbonate, DMDC was added at concentrations ranging from 1–250 ppm. Tubes were then incubated for 14 days at 25° C. to allow surviving yeasts to grow out. At 14 days growth was measured by optical density at 600 nm in x11 diluted samples, and blank values subtracted.

Comparison of this Figure with FIG. 11 shows very substantially fewer tubes supporting yeast growth in the presence of the essential oil components, citral dimethyl acetal cumic alcohol.

EXAMPLE 3

Effective Concentrations of Essential Oils

Figure 21:
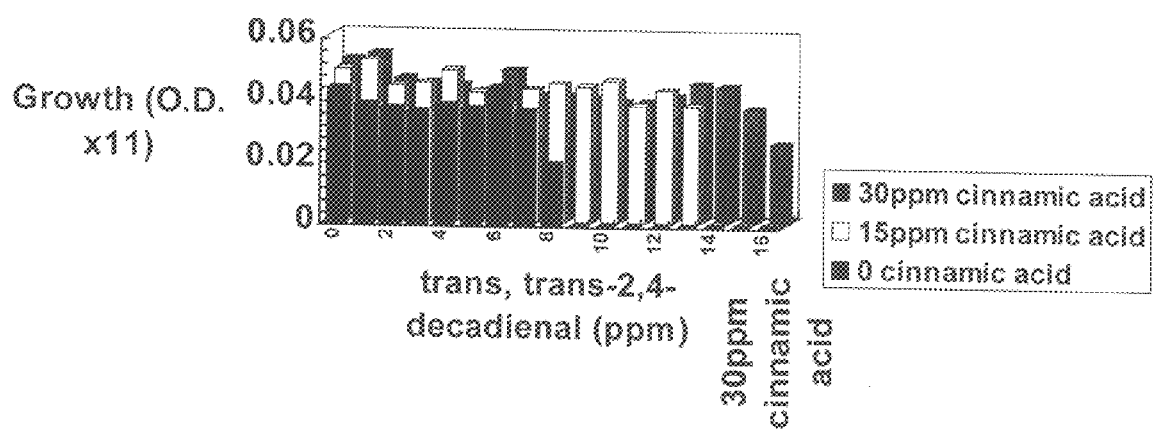
FIG. 21 shows the effective concentrations of trans,trans-2,4-decadienal.

FIG. 21 shows the effective concentrations of trans,trans-2,4-decadienal. Growth of yeast *Saccharomyces cerevisiae* X2180-1B in 30 ml bottles containing RTD tea, 0.14% tea containing 0, 15 ppm or 30 ppm of cinnamic acid. Rows of tubes also contained trans,trans-2,4-decadienal at concentrations ranging between 0–16 ppm. After inoculation at $10^4$ cells of yeast, tubes were then incubated for 14 days at 25° C. to allow surviving yeasts to grow out. At 14 days growth was measured by optical density at 600 nm in x11 diluted samples, and blank values subtracted.

Figure 22:
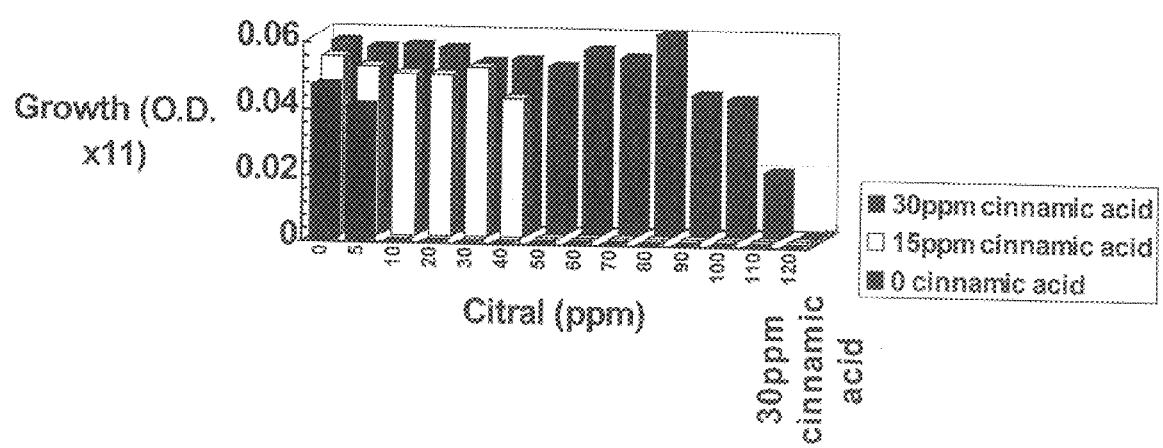
FIG. 22 shows the effective concentrations of citral.

FIG. 22 shows the effective concentrations of citral. Growth of yeast *Saccharomyces cerevisiae* X2180-1B in 30 ml bottles containing RTD tea, 0.14% tea containing 0, 15 ppm or 30 ppm of cinnamic acid. Rows of tubes also contained citral at concentrations ranging between 0–120 ppm. After inoculation at $10^4$ cells of yeast, tubes were then incubated for 14 days at 25° C. to allow surviving yeasts to grow out. At 14 days growth was measured by optical density at 600 nm in x11 diluted samples, and blank values subtracted.

What is claimed is:

1. An ambient stable beverage that contains a preservative system comprising cinnamic acid, dimethyl dicarbonate and at least one essential oil.

2. A beverage according to claim 1 wherein the beverage contains 1 to 175 ppm cinnamic acid.

3. A beverage according to claim 2 wherein the beverage contains 1 to 60 ppm cinnamic acid.

4. A beverage according to claim 1 wherein the beverage contains 1 to 500 ppm dimethyl dicarbonate.

5. A beverage according to claim 1 wherein the beverage contains 1 to 250 ppm dimethyl dicarbonate.

6. A beverage according to claim 1 wherein the essential oil is selected from the group consisting of benzyl-4-hydroxybenzoate, 4-tert-butylcyclohexanone, carvone, cinnamaldehyde, cinnamic acid, citral, citral dimethyl acetal, citronellol, cumic alcohol, cyclohexanebutyric acid, 2-cyclohexylethyl acetate, trans,trans-2,4-decadienal, decanal, decanol, dihydrocarveol, 3,7-dimethyl-1-octanol, ethyl cyclohexanepropionate, ethyl pyruvate, ethyl vanillin, jasmone, o-methoxycinnamaldehyde, methyl anthranilate, α-methyl-trans-cinnamaldehyde, methyl eugenol, methyl nonanoate, 2-methyl-2-pentenal, 5-methyl-2-phenyl-2-hexenal, methyl salicylate, 4-methyl-5-thiazoleethanol acetate, myrtenol, neomenthol, nonanoic acid, γ-nonanoic lactone, δ-octalactone, octanoic acid (caprylic), 1-octanol, 1-phenyl-1,2-propanedione, piperonyl acetate, propyl benzoate, pulegone, sorbic aldehyde (2,4-hexadienal), terpinen-4-ol, tolualdehyde, γ-undecalactone, undecanal, 1-undecanol, and vanillin.

7. A beverage according to claim 6 wherein the essential oil is selected from the group consisting of cinnamic acid, citral, citral dimethyl acetal, cumic alcohol (isopropylbenzyl alcohol), trans,trans-2,4-decadienal, 3,7-dimethyl-1-octanol, ethyl pyruvate, myrtenol and piperonyl acetate.

8. A beverage according to claim 1 wherein the preservative system contains 1 to 100 ppm of one or more of the essential oils.

9. A beverage according to claim 1 wherein the beverage is a tea based beverage.

10. A beverage according to claim 9 wherein the beverage contains 0.01 to 3% tea solids.

11. A method for preparing an ambient-stable tea based beverage suitable for cold filing comprising adding cinnamic acid, dimethyl dicarbonate and at least one essential oil to a tea extract.

* * * * *